United States Patent
Chakrovorthy et al.

(10) Patent No.: US 10,255,947 B2
(45) Date of Patent: Apr. 9, 2019

(54) MITIGATING DRIFT IN AUDIOVISUAL ASSETS

(71) Applicant: NETFLIX, INC., Los Gatos, CA (US)

(72) Inventors: Sreeram Chakrovorthy, Campbell, CA (US); Shinjan Tiwary, Santa Clara, CA (US); Harold Sutherland, San Jose, CA (US); Rohit Puri, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 85 days.

(21) Appl. No.: 14/841,533

(22) Filed: Aug. 31, 2015

(65) Prior Publication Data

US 2017/0062007 A1    Mar. 2, 2017

(51) Int. Cl.
| | |
|---|---|
| *G11B 27/00* | (2006.01) |
| *H04N 5/93* | (2006.01) |
| *G11B 27/031* | (2006.01) |
| *G11B 27/34* | (2006.01) |
| *G11B 27/36* | (2006.01) |
| *H04N 21/262* | (2011.01) |
| *H04N 21/239* | (2011.01) |
| *G11B 27/02* | (2006.01) |
| *H04N 21/234* | (2011.01) |
| *H04N 21/2368* | (2011.01) |
| *H04N 21/434* | (2011.01) |
| *H04N 21/44* | (2011.01) |

(52) U.S. Cl.
CPC ............ *G11B 27/031* (2013.01); *G11B 27/02* (2013.01); *G11B 27/34* (2013.01); *G11B 27/36* (2013.01); *H04N 21/2368* (2013.01); *H04N 21/2393* (2013.01); *H04N 21/23424* (2013.01); *H04N 21/2625* (2013.01); *H04N 21/4341* (2013.01); *H04N 21/4344* (2013.01); *H04N 21/44016* (2013.01)

(58) Field of Classification Search
CPC .................................................... G11B 27/031
USPC ......................................................... 386/278
See application file for complete search history.

(56) References Cited

U.S. PATENT DOCUMENTS

| | | | |
|---|---|---|---|
| 6,181,383 B1 | 1/2001 | Fox | |
| 2002/0047937 A1 | 4/2002 | Wells | |
| 2002/0116361 A1* | 8/2002 | Sullivan | ............. H04N 21/8547 |
| 2008/0079851 A1* | 4/2008 | Stanger | .................. H04N 5/067 348/575 |

(Continued)

OTHER PUBLICATIONS

Extended European Search Report Application No. 13881379.5, dated Oct. 18, 2016, 8 pages.

*Primary Examiner* — Thai Q Tran
*Assistant Examiner* — Girumsew Wendmagegn
(74) *Attorney, Agent, or Firm* — Artegis Law Group, LLP

(57) ABSTRACT

One embodiment of the present invention sets forth a technique for mitigating drift in audiovisual assets. The technique includes determining that an edit associated with a presentation timeline is within boundaries of a video frame. The technique further includes calculating a temporal drift associated with the edit, where the temporal drift comprises a duration of time between the edit and a boundary of the video frame. The technique further includes determining whether to include the video frame in the presentation timeline based on the temporal drift and an accumulated temporal drift associated with the presentation timeline.

19 Claims, 11 Drawing Sheets

(56) References Cited

U.S. PATENT DOCUMENTS

2011/0052154 A1 3/2011 Weber
2012/0301112 A1 11/2012 Wallace

* cited by examiner

MITIGATING DRIFT IN AUDIOVISUAL ASSETS

BACKGROUND OF THE INVENTION

Field of the Invention

Embodiments of the present invention relate generally to audiovisual processing and, more particularly, to mitigating drift in audiovisual assets.

Description of the Related Art

Streaming digitally encoded audiovisual (AV) programs, such as feature length films and television programs, over the Internet has become increasingly popular as the availability of high-bandwidth Internet connections has expanded. Streaming media services typically include a content server, a content player, and a communications network connecting the content server to the content player. The content server is configured to store media files (or "streams") made available to end-users. Each media file may provide a digital version of a movie, a television program, a sporting event, a staged or live event captured by recorded video, etc.

Oftentimes, audiovisual material is edited as part of a post-production process in order to convert such material into one or more media files for distribution to end-users. Those media files are usually distributed as part of a streaming media service or through more conventional physical media channels. Audiovisual material is edited for a variety of reasons, including, for example, to convey the author's creative intent, to delete certain scenes in order to conform to ratings, or to include credits that are not a part of the feature presentation. Metadata relating to such edits is typically provided with the audiovisual material in order to facilitate conversion of the audiovisual material into media file(s) that can then be distributed to end-users.

One drawback of the above approach is that a given processing edit specified by an author can introduce temporal drift between the audio and video tracks making up the audiovisual material when the edit enters or exits a constituent track at a non-sample boundary. When accumulated over the duration of the resulting media file, multiple edits to the audiovisual material can produce a perceptible lag or lead between the audio track and the video track, which degrades quality and can result in a poor user experience.

As the foregoing illustrates, improved techniques for editing audiovisual material would be useful.

SUMMARY OF THE INVENTION

One embodiment of the present invention sets forth a method for mitigating drift in audiovisual assets. The method includes determining that an edit associated with a presentation timeline is within boundaries of a video frame. The method further includes calculating a temporal drift associated with the edit, where the temporal drift comprises a duration of time between the edit and a boundary of the video frame. The method further includes determining whether to include the video frame in the presentation timeline based on the temporal drift and an accumulated temporal drift associated with the presentation timeline.

Further embodiments provide, among other things, a non-transitory computer-readable medium and a control server configured to implement the method set forth above.

At least one advantage of the disclosed techniques is that edits associated with a presentation timeline are processed to reduce temporal drift between an audio track and a video track included in the presentation timeline. In addition, the negative impact of any resulting temporal drift associated with non-sample boundary edits on the end-user viewing experience can be mitigated by transmitting metadata specifying the accumulated temporal drift to an endpoint device when the corresponding portions of the media file are transmitted to the endpoint device. The endpoint device can parse the metadata and compensate for the accumulated temporal drift, for example, by modifying an audio delay parameter associated with the endpoint device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
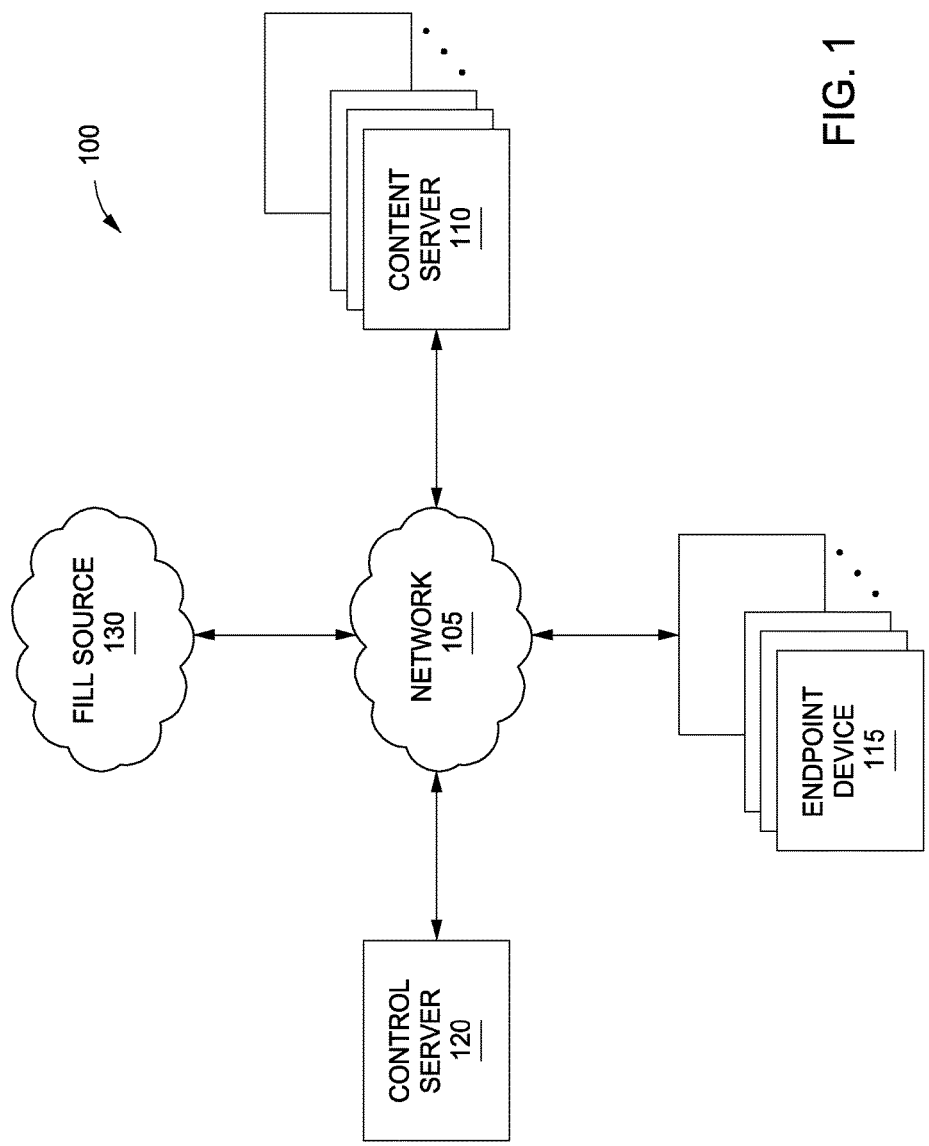
FIG. 1 illustrates a network infrastructure configured to implement one or more aspects of the present invention.

FIG. 1 illustrates a network infrastructure 100 configured to implement one or more aspects of the present invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "media file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various media files that are tracked and managed by the control server 120. Each content server 110 may further communicate with a fill source 130 and one or more other content servers 110 in order "fill" each content server 110 with copies of various media files. In addition, content servers 110 may respond to requests for media files received from endpoint devices 115. The media files may then be distributed from the content server 110 or via a broader content distribution network. In some embodiments, the content servers 110 enable users to authenticate (e.g., using a username and password) in order to access media files stored on the content servers 110. Although only a single control server 120 is shown in FIG. 1, in various embodiments multiple control servers 120 may be implemented to track and manage media files.

In various embodiments, the fill source 130 may include an online storage service (e.g., Amazon® Simple Storage Service, Google® Cloud Storage, etc.) in which a catalog of files, including thousands or millions of media files, is stored and accessed in order to fill the content servers 110. Although only a single fill source 130 is shown in FIG. 1, in various embodiments multiple fill sources 130 may be implemented to service requests for media files.

Figure 2:
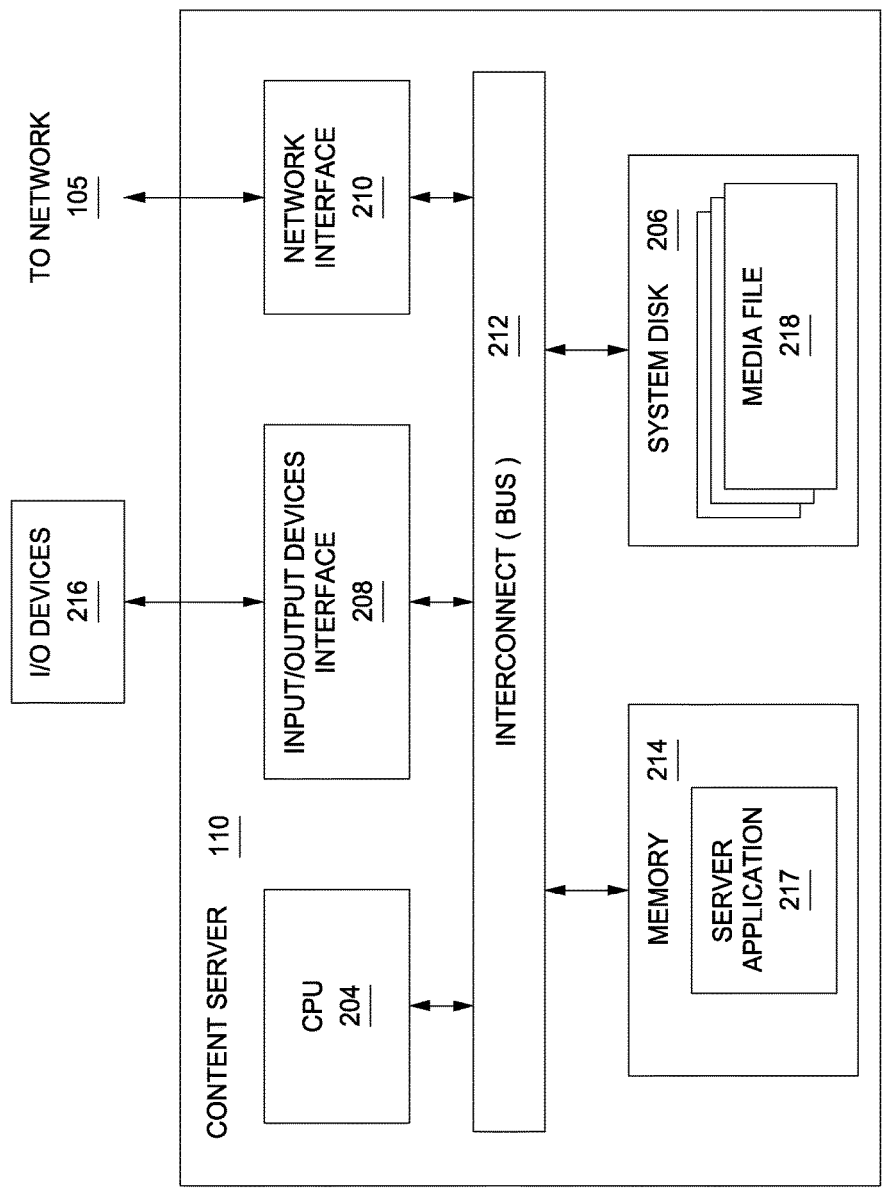
FIG. 2 is a block diagram of the content server of FIG. 1, according to various embodiments of the present invention.

FIG. 2 is a block diagram of the content server 110 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as media files 218 (e.g., audio files, video files, subtitles, etc.). The media files 218 can then be retrieved by one or more endpoint devices 115 via the network 105. In some embodiments, the network interface 210 is configured to operate in compliance with the Ethernet standard.

The system memory 214 includes a server application 217 configured to service requests for media files 218 received from endpoint device 115 and other content servers 110. When the server application 217 receives a request for a media file 218, the server application 217 retrieves the corresponding media file 218 from the system disk 206 and transmits the media file 218 to an endpoint device 115 or a content server 110 via the network 105.

Figure 3:
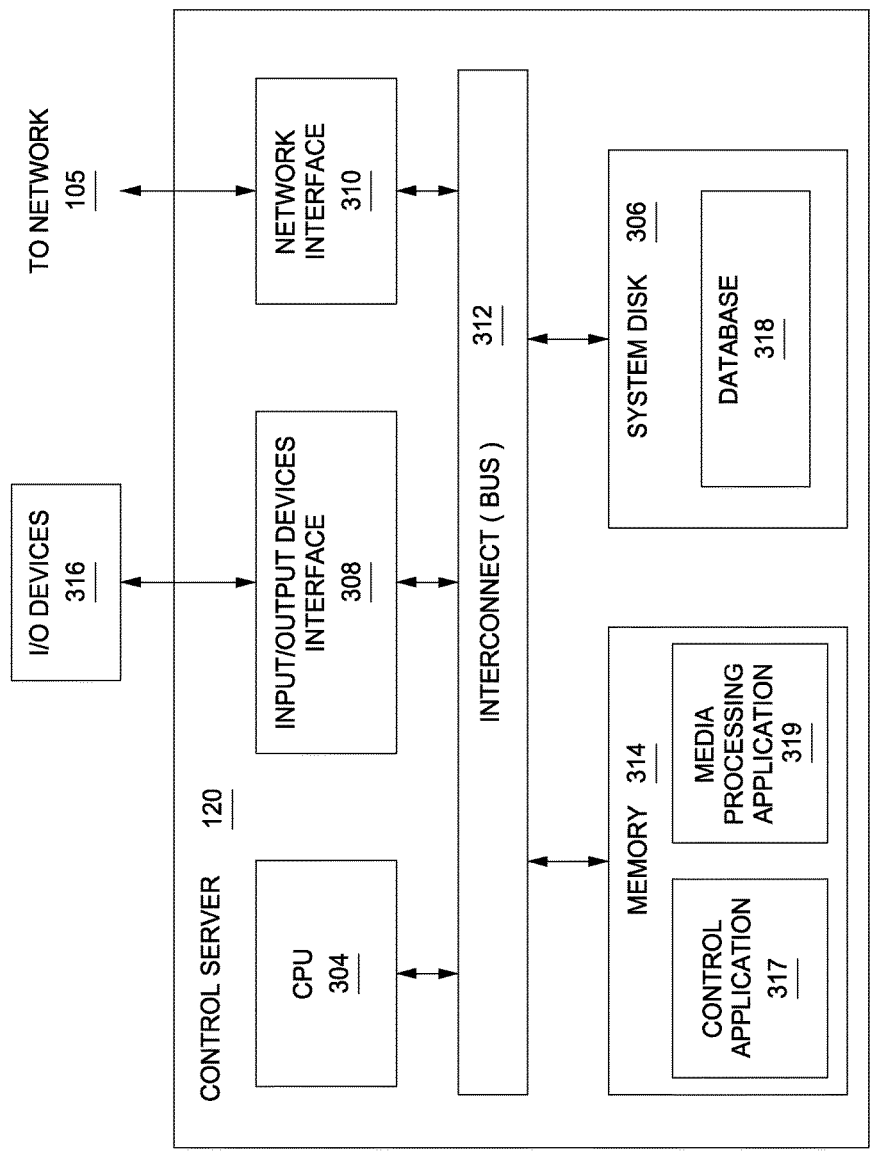
FIG. 3 is a block diagram of the control server of FIG. 1, according to various embodiments of the present invention.

FIG. 3 is a block diagram of the control server 120 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the fill source(s) 130, and the media files 218.

The system memory 314 includes a control application 317 configured to access information stored in the database 318 and process the information to determine the manner in which specific media files 218 will be replicated across content servers 110 included in the network infrastructure 100. The system memory 314 further includes a media processing application 319 configured to generate one or more media files 218 based on audiovisual material and information specifying how the audiovisual material is to be edited to generate media file(s) 218. For example, in various embodiments, edits made to an audio track and/or a video track in order to generate a media file 218 may be specified in metadata that is included in, or otherwise provided with, the audio track and/or the video track.

Figure 4:
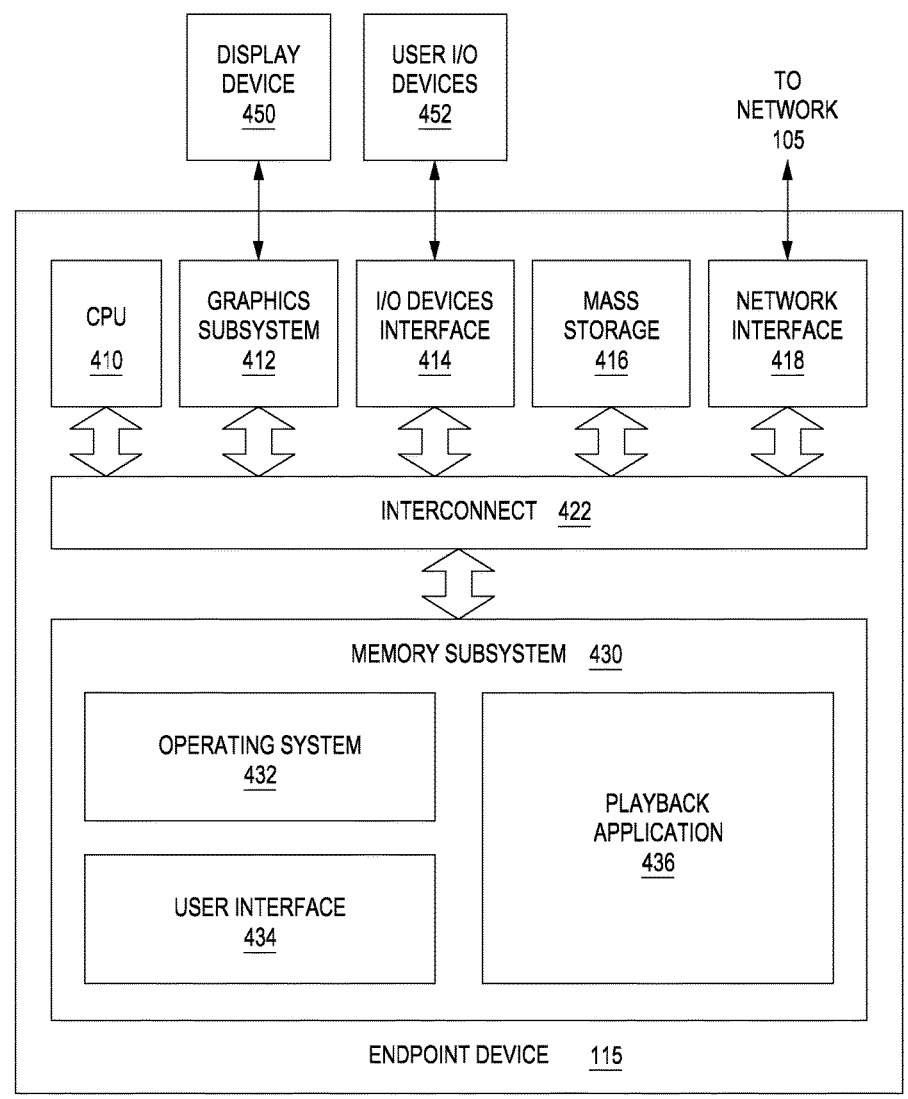
FIG. 4 is a block diagram of the endpoint device of FIG. 1, according to various embodiments of the present invention.

FIG. 4 is a block diagram of the endpoint device 115 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418 and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. A television is an example of a device known in the art that can display video frames and generate an acoustic output.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Mitigation of Drift in Audiovisual Assets

As described above, audiovisual material oftentimes is edited as part of a post-production process in order to convert the audiovisual material into a media file 218 for distribution to end-users. Editing of audiovisual material could be performed for various reasons, such as to more accurately convey the author's creative intent, to delete certain scenes in order to conform to ratings standards, and/or to include credits that are not a part of the feature presentation. Metadata relating to such edits is typically provided with the audiovisual material in order to facilitate processing of the audiovisual material into one or more media files 218 that convey the creative intent of the author.

However, under certain circumstances, conventional techniques for processing edits to audiovisual material can introduce temporal drift between an audio tracks and a video track. In particular, when an edit fails to enter (or exit) an audio track and/or a video track at a sample boundary (e.g., when the edit falls within the boundaries of an audio frame and/or a video frame), drift is introduced into the presentation timeline and, thus, into the media file 218 generated based on the presentation timeline. Further, when accumulated over the duration of the presentation timeline, multiple non-sample boundary edits to the audiovisual material may produce a perceptible lag or lead between an audio track and a video track, resulting in a poor user experience.

Accordingly, in various embodiments, the media processing application 319 may reduce the magnitude of temporal drift that is accumulated over the duration of a presentation timeline by determining, for each non-sample boundary edit, whether the corresponding audio frame and/or a video frame should be included in or excluded from the presentation timeline. Additionally, in some embodiments, the media processing application 319 further mitigates the impact of accumulated temporal drift on the user experience by generating metadata specifying the accumulated temporal drift for each portion of a media file 218. The metadata is then transmitted to an endpoint device 115 on which the media file 218 is to be played, enabling the endpoint device 115 to compensate for the accumulated temporal drift, such as by adjusting an audio delay parameter associated with the endpoint device 115.

Because, in a typical media file 218 (e.g., having a video framerate of 24 to 30 frames/second and an audio framerate of 44,100 to 48,000 frames/second), the duration of each video frame is orders of magnitude longer than the duration of each audio frame, the techniques described below primarily focus on including or excluding video frames. However, each of the techniques described below also is applicable to determining whether to include or exclude audio frames associated with non-sample boundary edits. More specifically, an edit that falls within the boundaries of an audio frame is likely to be relatively close (e.g., approximately 20 microseconds or less for a 48 kHz audio sampling rate) to one of the boundaries of the audio frame. By contrast, an edit that falls within the boundaries of a video frame may be relatively far (e.g., up to approximately 30 milliseconds for 30 video frames/second) from one of the boundaries of the video frame. Accordingly, the techniques described below may be implemented to determine whether to include or exclude a video frame and/or an audio frame intersected by a particular edit associated with a presentation timeline.

Figure 5:
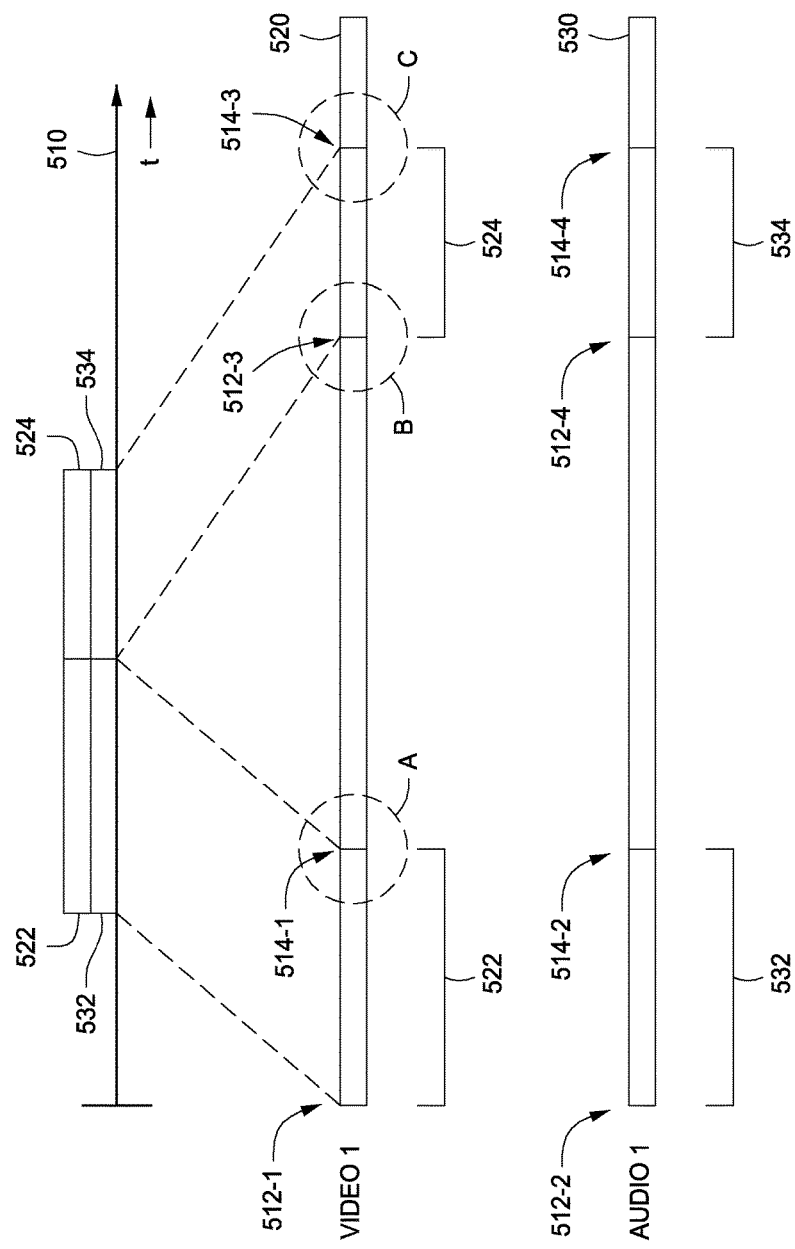
FIG. 5 is a conceptual illustration of a presentation timeline generated by editing a video track and an audio track, according to various embodiments of the present invention.

FIG. 5 is a conceptual illustration of a presentation timeline 510 generated by editing a video track 520 and an audio track 530, according to various embodiments of the present invention. As shown, the presentation timeline 510 includes a first video portion 522 and a second video portion 524 of the video track 520 and a first audio portion 532 and a second audio portion 534 of the audio track 530. Each of the first video portion 522, the second video portion 524, the first audio portion 532, and the second audio portion 534 includes an entry edit 512 (e.g., entry edit 512-1, entry edit 512-2, etc.) and an exit edit 514 (e.g., exit edit 514-1, exit edit 514-2, etc.).

In general, entry edits 512 and exit edits 514 may be specified in any technically feasible manner. For example, each entry edit 512 and exit edit 514 may be specified in metadata associated with the presentation timeline 510 and/or specified in metadata associated with a video track 520 and/or an audio track 530. For clarity of explanation, FIG. 5 includes only a single video track 520 and a single audio track 530. However, in other embodiments, each portion of the presentation timeline 510 may specify edits associated with any number of video tracks 520 and/or audio tracks 530. Furthermore, for clarity of explanation, the embodiments described below assume that the video track 520 has a rate of 30 frames/second. However, in other embodiments, any technically feasible framerate, including variable framerates, may be implemented.

FIG. 5 depicts each entry edit 512 and exit edit 514 of the video track 520 (e.g., 512-1 and 514-1) as being temporally aligned with the corresponding entry edit 512 and exit edit 514 of the audio track 530 (e.g., 512-2 and 514-2). However, in some embodiments, an entry edit 512 and/or an exit edit 514 of the video track 520 may be temporally misaligned with a corresponding entry edit 512 and/or exit edit 514 of the audio track 530. For example, with reference to FIG. 5, video portion 522 may correspond to a first time interval of the video track 520 (e.g., from t=0 seconds to t=4 seconds), and audio portion 532 may correspond to a second time interval of the audio track 530 that is partially overlapping (e.g., from t=2 seconds to t=6 seconds) or non-overlapping (e.g., from t=7 seconds to t=11 seconds) with the first time interval. Further, one or both of the video portion 522, 524 and audio portion 532, 534 may correspond to multiple time intervals of the video track 520 and/or audio track 530. For example, with reference to FIG. 5, video portion 522 may correspond to a single time interval of the video track 520 (e.g., from t=0 seconds to t=4 seconds), and audio portion 532 may correspond to multiple, discontinuous time intervals of the audio track 530 (e.g., from t=0 seconds to t=2 seconds and from t=5 seconds to t=7 seconds). Accordingly, entry edits 512 and exit edits 514 may be specified in a flexible manner when generating the presentation timeline 510.

Figure 6A:
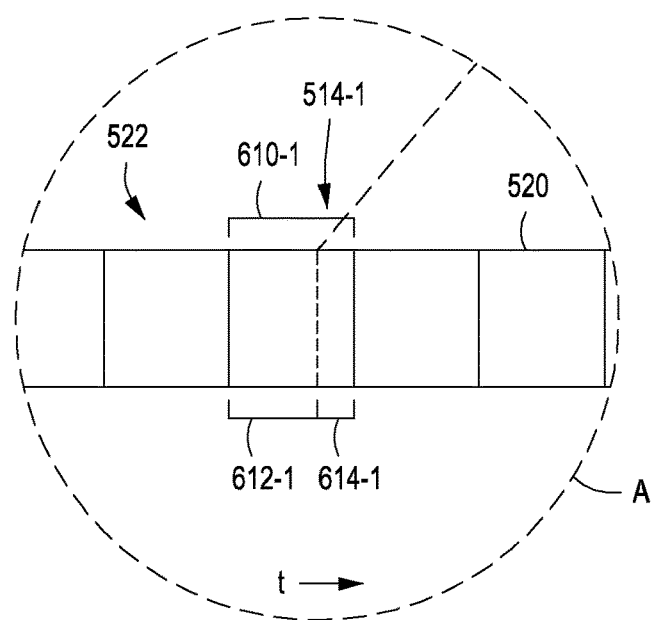
FIGS. 6A-6C is a conceptual illustration of non-frame boundary edits made to the video track when generating the presentation timeline of FIG. 5, according to various embodiments of the present invention.
Figure 6B:
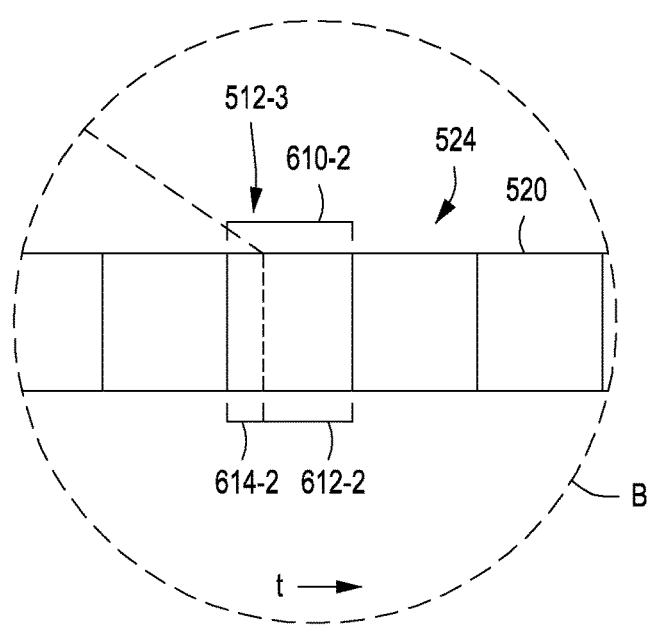
Figure 6C:
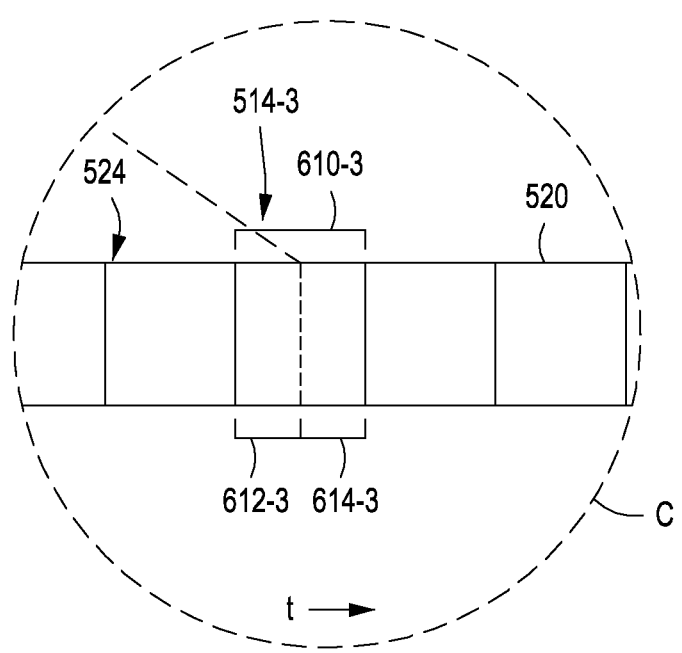

FIGS. 6A-6C is a conceptual illustration of non-frame boundary edits made to the video track 520 when generating the presentation timeline 510 of Figures, according to various embodiments of the present invention. As shown in FIG. 6A, exit edit 514-1 of the first video portion 522 falls within the boundaries of video frame 610-1. Consequently, if a constant video framerate is maintained, then the media processing application 319 must determine whether the video frame 610-1 should be included in or excluded from the presentation timeline 510 when processing the exit edit 514-1.

If the video frame 610-1 is included in the presentation timeline 510, then a lag time 614-1 of approximately 10 milliseconds (e.g., a temporal drift of +10 milliseconds) will be generated in the presentation timeline 510. If, on the other hand, the video frame 610-1 is excluded from the presentation timeline 510, then a lead time 614-1 of approximately 23 milliseconds (e.g., a temporal drift of −23 milliseconds) will be generated in the presentation timeline 510. Although the techniques discussed herein are described with reference to seconds (e.g., milliseconds), in other embodiments, the techniques may implement any technically feasible unit of time (e.g., ticks).

In various embodiments, for each edit (e.g., entry edit 512 and exit edit 514), the media processing application 319 determines whether to include or exclude a video frame 610 intersected by the edit based on the location of the edit relative to the boundaries of the video frame 610. Additionally, when determining whether to include or exclude a video frame 610 intersected by the edit, the media processing application 319 may further consider the accumulated temporal drift at the location of the edit in the presentation timeline 510. For example, the media processing application 319 may determine whether to include or exclude a video frame 610 based on whether including (or excluding) the video frame 610 would cause the accumulated temporal drift to exceed a threshold value (e.g., a lag time and/or lead time of 10 to 100 milliseconds).

Alternatively, the media processing application 319 may determine whether to include or exclude a video frame 610 based on which outcome would result in an accumulated temporal drift having a lower magnitude. In a specific example, with reference to exit edit 514-1, the media processing application 319 could determine that the video frame 610-1 should be included, since including the video frame 610-1 will result in an accumulated temporal drift having a lower magnitude (e.g., a lag time 614-1 of approximately 10 milliseconds) than the accumulated temporal drift that would be generated by excluding the video frame 610-1 (e.g., a lead time 612-1 of approximately 23 milliseconds).

Further, in some embodiments, the media processing application 319 may be biased towards maintaining either a positive accumulated temporal drift (a lag time 614) or a negative accumulated temporal drift (a lead time 612) when processing each edit. Such a bias may be implemented based on whether a user is more likely to notice a positive accumulated temporal drift or a negative accumulated temporal drift. In order to implement such a bias, the media processing application 319 could assign a first threshold value to the positive accumulated temporal drift (a threshold lag time) and assign a second threshold value having a lower magnitude to the negative accumulated temporal drift (a threshold lead time). Then, for each edit, the media processing application 319 would determine whether including or excluding the corresponding video frame 610 would cause the accumulated temporal drift to exceed the first threshold value or the second threshold value.

Figure 7:
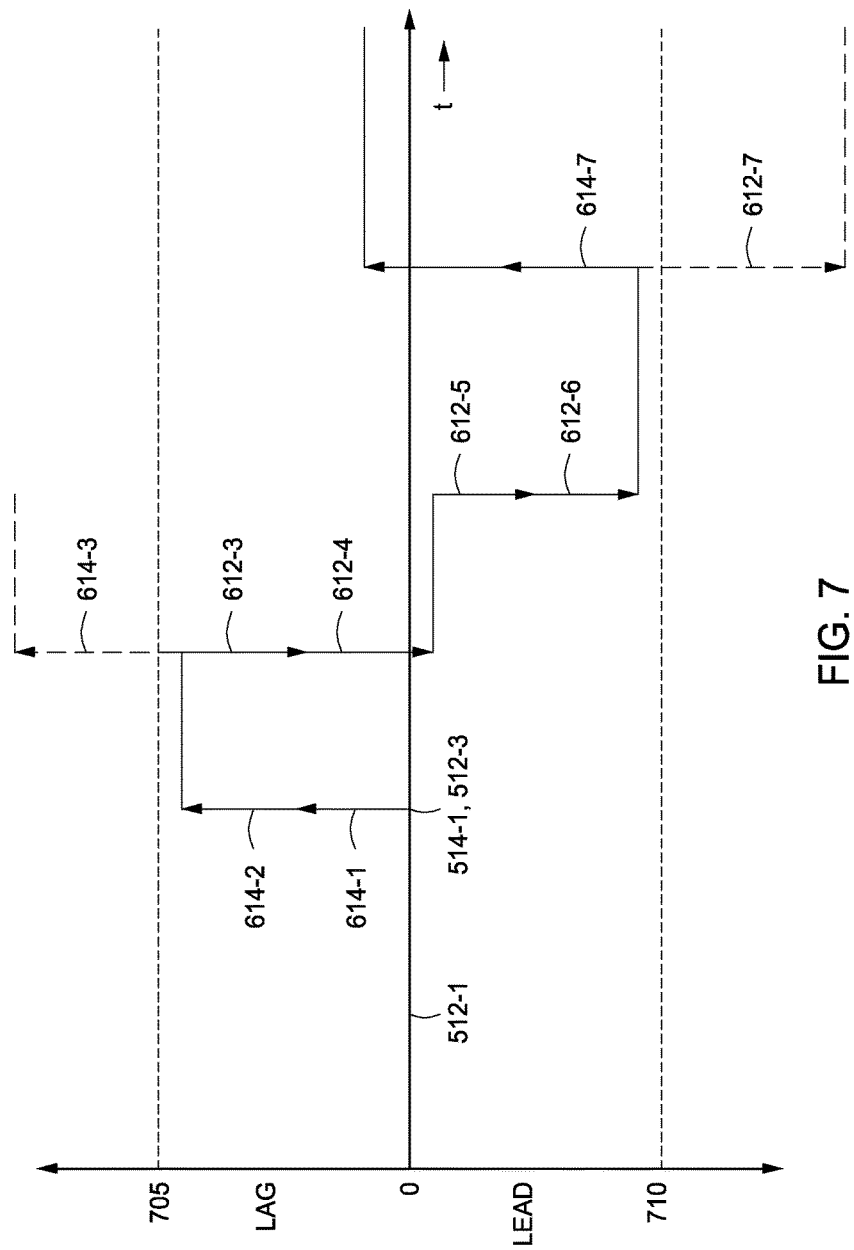
FIG. 7 is a conceptual illustration of the accumulated temporal drift produced when generating in the presentation timeline of FIG. 5, according to various embodiments of the present invention.

Returning to FIG. 6A, the media processing application 319 determines that the video frame 610-1 should be included. Accordingly, exit edit 514-1 generates an accumulated temporal drift of approximately 10 milliseconds (a lag time 614-1 of approximately 10 milliseconds) when the first video portion 522 is added to the presentation timeline 510, as shown in FIG. 7, which is a conceptual illustration of the accumulated temporal drift produced when generating in the presentation timeline 510 of FIG. 5, according to various embodiments of the present invention. As described above, the decision to include video frame 610-1 when adding the first video portion 522 to the presentation timeline 510 could be based on the media processing application 319 determining that including the video frame 610-1 would result in an accumulated temporal drift having a lower magnitude than if the video frame 610-1 were excluded.

As shown in Figures, entry edit 512-1 associated with the first video portion 522 is aligned with a video frame boundary (i.e., the leftmost boundary of the first video frame 610 included in the video track 520). Consequently, as shown in FIG. 7, no temporal delay is incurred in the presentation timeline 510 when the media processing application 319 processes entry edit 512-1.

In contrast to entry edit 512-1, entry edit 512-3 of the second video portion 524 falls within the boundaries of video frame 610-2, as shown in FIG. 6B. Consequently, if a constant video framerate is to be maintained, then the media processing application 319 must determine whether the video frame 610-2 should be included in or excluded from the presentation timeline 510. If the video frame 610-2 is included in the presentation timeline 510, then a lag time 614-2 of approximately 13 milliseconds (e.g., a temporal drift of +13 milliseconds) will be added to the accumulated temporal drift associated with the presentation timeline 510. If, on the other hand, the video frame 610-2 is excluded from the presentation timeline 510, then a lead time 612-2 of approximately 20 milliseconds (e.g., a temporal drift of −20 milliseconds) will be subtracted from the accumulated temporal drift associated with the presentation timeline 510.

In some embodiments, the media processing application 319 may determine whether inclusion of the video frame 610-2 would cause the accumulated temporal drift to exceed a threshold lag time 705. If inclusion of the video frame 610-2 would not cause the accumulated temporal drift to exceed a threshold lag time 705, then the video frame 610-2 is included in the presentation timeline 510. This outcome is illustrated in FIG. 7, which shows that inclusion of both video frame 610-1 and video frame 610-2 in the presentation timeline 510 generates an accumulated temporal drift of approximately 23 milliseconds.

Next, as shown in FIG. 6O, the media processing application 319 determines that exit edit 514-3 of the second video portion 524 falls within the boundaries of video frame 610-3. Consequently, if a constant video framerate is to be maintained, then the media processing application 319 must determine whether the video frame 610-3 should be included in or excluded from the presentation timeline 510. If the video frame 610-3 is included in the presentation timeline 510, then a lag time 614-3 of approximately 15 milliseconds (e.g., a temporal drift of +15 milliseconds) will be added to the accumulated temporal drift associated with the presentation timeline 510. If, on the other hand, the video frame 610-3 is excluded from the presentation timeline 510, then a lead time 612-3 of approximately 18 milliseconds (e.g., a temporal drift of −18 milliseconds) will be subtracted from the accumulated temporal drift associated with the presentation timeline 510.

In some embodiments, the media processing application 319 may determine that inclusion of the video frame 610-3 would cause the accumulated temporal drift to exceed the threshold lag time 705, as shown in FIG. 7. Accordingly, in such embodiments, the video frame 610-3 would be excluded from the presentation timeline 510, reducing the accumulated temporal drift from approximately 23 milliseconds to approximately 5 milliseconds.

Although not shown in FIG. 5, the presentation timeline 510 may further include a third video portion that is adjacent to the second video portion and a fourth video portion that is adjacent to the third video portion. Then, as shown in FIG. 7, the media processing application 319 may determine that a video frame 610 associated with the entry edit 512 of the third video portion will be included, causing a lead time 612-4 of approximately 7 milliseconds to be subtracted from the accumulated temporal drift. Accordingly, after processing of the entry edit 512 associated with the third video portion, the presentation timeline 510 would have a negative accumulated temporal drift (a lead time).

Additionally, as further shown in FIG. 7, the exit edit 514 associated with the third video portion and the entry edit 512 associated with the fourth video portion may further decrease the accumulated temporal drift of the presentation timeline 510 by lead time 612-5 and lead time 612-6, respectively. Then, upon processing the exit edit 514 associated with the fourth video portion, the media processing application 319 determines that exclusion of the corresponding video frame 610 would incur a lead time 612-7 of approximately 20 milliseconds, causing the accumulated temporal drift to fall below the lead time threshold 710. Consequently, the media processing application 319 determines that the video frame 610 associated with the exit edit 514 of the fourth video portion should be included in the presentation timeline 510, causing the magnitude of the accumulated temporal drift to be reduced by a lag time 614-7 of approximately 13 milliseconds. The media processing application 319 then continues to process each entry edit 512 and exit edit 514 associated with subsequent video portions in a similar manner.

Although the techniques implemented in FIGS. 5-7 proceed either towards the lag threshold time 705 (e.g., by including video frames 610) or towards the lead threshold time 710 (e.g., by excluding video frames 610) until either the lag threshold time 705 or the lead threshold time 710 would be exceeded, in other embodiments, the media processing application 319 may decide to include or exclude a video frame 610 depending upon whether the accumulated temporal drift is currently positive or negative (e.g., above or below a threshold value of zero). For example, if the accumulated temporal drift is currently positive when a particular entry edit 512 or exit edit 514 is being processed, then the media processing application 319 could determine that the corresponding video frame 610 should be excluded. If, on the other hand, the accumulated temporal drift is currently negative when a particular entry edit 512 or exit edit 514 is being processed, then the media processing application 319 could determine that the corresponding video frame 610 should be included. In some embodiments, this process of determining whether to include or exclude a video frame 610 based on whether the accumulated temporal drift is currently positive or negative could be performed for each edit processed by the media processing application 319. Accordingly, such a technique could enable the media processing application 319 to maintain an accumulated temporal drift that is close to zero.

In other embodiments, the media processing application 319 may decide to include or exclude a video frame 610 depending upon whether the accumulated temporal drift is currently above or below a particular threshold value. For example, if the accumulated temporal drift is currently above a threshold value (e.g., 30 milliseconds) when a particular entry edit 512 or exit edit 514 is being processed, then the media processing application 319 could determine that the corresponding video frame 610 should be excluded. If, on the other hand, the accumulated temporal drift is currently below the threshold value when a particular entry edit 512 or exit edit 514 is being processed, then the media processing application 319 could determine that the corresponding video frame 610 should be included. In some embodiments, this process of determining whether to include or exclude a video frame 610 based on whether the accumulated temporal drift is currently above or below a threshold value could be performed for each edit processed by the media processing application 319. Accordingly, such a technique could enable the media processing application 319 to maintain an accumulated temporal drift that is close to the threshold value.

In various embodiments, the media processing application 319 also may process dwell edits and empty edits by implementing techniques that are similar to the techniques implemented to process the entry edits 512 and exit edits 514 described above. For example, when a dwell edit—specifying that a particular image should be displayed in the presentation timeline 510 for a certain period of time—has a duration that is not an integer multiple of a video frame duration (e.g., approximately 33 milliseconds for 30 frames/ second), then the media processing application 319 may include a video frame 610 by rounding up to the nearest integer multiple. Alternatively, the media processing application 319 may exclude a video frame 610 by rounding down to the nearest integer multiple. Similarly, when an empty edit—specifying a duration of time by which the presentation timeline 510 should be delayed or stalled—has a duration that is not an integer multiple of a video frame duration, then the media processing application 319 may include a video frame 610 by rounding up to the nearest integer multiple or exclude a video frame 610 by rounding down to the nearest integer multiple.

In still other embodiments, instead of (or in addition to) including and excluding entire video frames 610, the media processing application 319 may include or exclude portions of video frames 610 by adjusting the framerate of the presentation timeline 510. For example, upon encountering an entry edit 512 that falls within the boundaries of a video frame 610, the media processing application 319 could determine a video framerate that would enable the video frame 610 to be played back for the duration of time between the location of the entry edit 512 and the rightmost boundary of the video frame 610. Additionally, upon encountering an exit edit 514 that falls within the boundaries of a video frame 610, the media processing application 319 could determine a video framerate that would enable the video frame 610 to be played back for the duration of time between the location of the exit edit 514 and the leftmost boundary of the video frame 610. The media processing application 319 could then store the modified video framerate in metadata associated with the corresponding portion(s) of the presentation timeline 510 and/or resulting media file 218, enabling a client device to play the media file 218 at a variable framerate.

Figure 8:
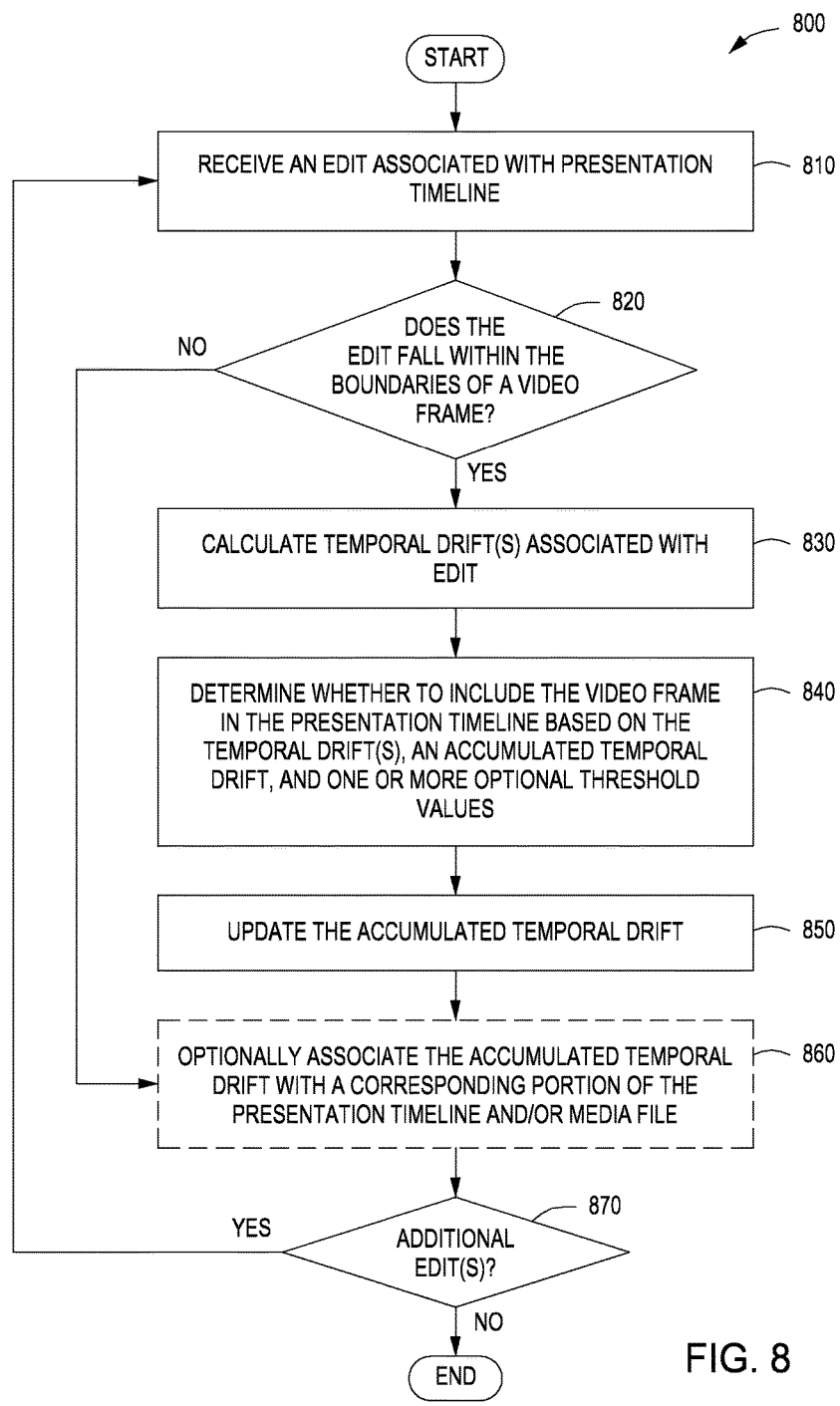
FIG. 8 illustrates a flow diagram of method steps for computing the accumulated temporal drift in a media file, according to various embodiments of the present invention.

FIG. 8 illustrates a flow diagram of method steps for computing the accumulated temporal drift in a media file 218, according to various embodiments of the present invention. Although the method steps are described in conjunction with the systems of FIGS. 1-7, persons skilled in the art will understand that any system configured to perform the method steps, in any order, falls within the scope of the present invention.

As shown in FIG. 8, a method 800 begins at step 810, where the media processing application 319 receives an edit (e.g., an entry edit 512 or an exit edit 514) associated with a presentation timeline 510. At step 820, the media processing application 319 determines whether the edit falls within the boundaries of a video frame 610. If the media processing application 319 determines that the edit falls within the boundaries of a video frame 610, then the method 800 proceeds to step 830, where the media processing application 319 calculates one or more temporal drifts associated with the edit. For example, the media processing application 319 may calculate both a first temporal drift that would result if the video frame 610 was included in the presentation timeline 510 and a second temporal drift that would result if the video frame 610 was excluded from the presentation timeline 510.

At step 840, the media processing application 319 determines whether to include the video frame 610 intersected by the edit based on the temporal drift(s) calculated at step 830, an accumulated temporal drift associated with the presentation timeline 510 proximate to the location of the edit, and one or more optional threshold values (e.g., a lag time threshold 705 and/or a lead time threshold 710). In general, at step 840, the media processing application 319 may implement any of the techniques described, such as determining whether a sum of the temporal drift and the accumulated temporal drift exceeds the lag time threshold 705 or the lead time threshold 710.

At step 850, the media processing application 319 updates the accumulated temporal drift based on whether the video frame 610 was included in or excluded from the presentation timeline 510. For example, the media processing application 319 may update the accumulated temporal drift by adding the appropriate temporal drift calculated at step 830 to the current accumulated temporal drift.

Then, at step 860, the media processing application 319 optionally associates the updated accumulated temporal drift with the corresponding portion of the presentation timeline 510 and/or with the corresponding portion of a media file 218 generated based on the presentation timeline 510. In some embodiments, the media processing application 319 associates the updated accumulated temporal drift with the corresponding portion of the presentation timeline 510 and/ or media file 218 by storing the updated accumulated temporal drift in metadata, such as metadata included in an index of the media file 218. In general, distinct accumulated temporal drift information (e.g., metadata) may be associated with portions of the presentation timeline 510 having any duration of time and/or portions of a media file 218 having any duration of time. However, in some embodiments, accumulated temporal drift information is associated with each 1 to 5 second portion (e.g., a 2 second portion) of a presentation timeline 510 and/or media file 218. In some embodiments, accumulated temporal drift information is associated with each fragment of a media file 218 that is transmitted over the network 105 to an endpoint device 115 and/or content server 110.

At step 870, the media processing application 319 determines whether additional edits are included in the presentation timeline 510. If one or more additional edits are included in the presentation timeline 510, then the method 800 returns to step 810. If no additional edits are included in the presentation timeline 510, then the method 800 terminates.

Alternatively, at step 820, the media processing application 319 could determine whether the edit is a dwell edit or an empty edit having a duration that is not an integer multiple of a video frame duration. If the media processing application 319 determines that the edit is a dwell edit or an empty edit having a duration that is not an integer multiple of a video frame duration, then the method 800 proceeds to step 830. At step 830, the media processing application 319 determines a temporal drift associated with including an additional video frame 610 (e.g., by rounding up to the nearest integer multiple) and/or a temporal drift associated with excluding the additional video frame 610 (e.g., by rounding down to the nearest integer multiple). The remainder of the method 800 then proceeds to steps 840 through 870 as described above.

Figure 9:
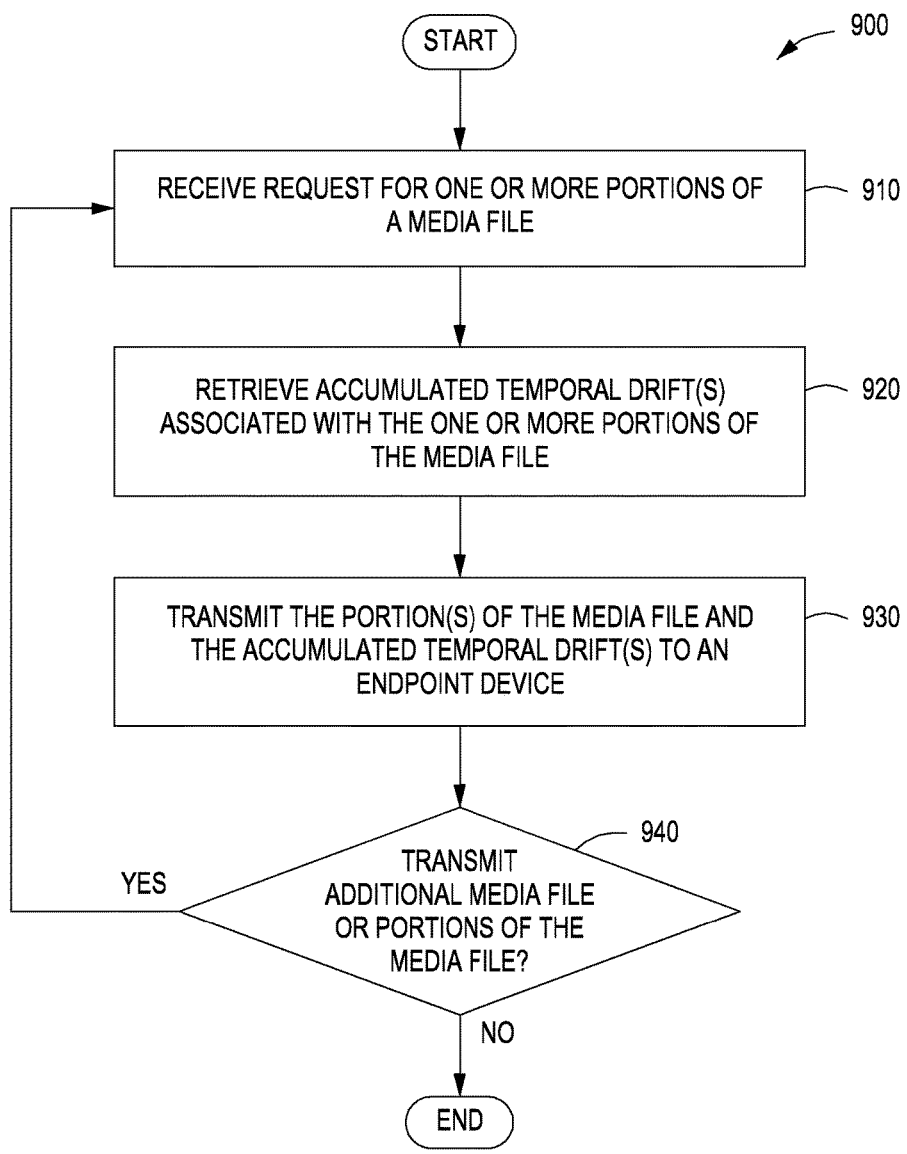
FIG. 9 illustrates a flow diagram of method steps for transmitting accumulated temporal drift information associated with a media file to an endpoint device, according to various embodiments of the present invention.

FIG. 9 illustrates a flow diagram of method steps for transmitting accumulated temporal drift information associated with a media file 218 to an endpoint device 115, according to various embodiments of the present invention. Although the method steps are described in conjunction with the systems of FIGS. 1-7, persons skilled in the art will understand that any system configured to perform the method steps, in any order, falls within the scope of the present invention.

As shown in FIG. 9, a method 900 begins at step 910, where the media processing application 319 and/or server application 217 receives a request for one or more portions of a media file 218. At step 920, the media processing application 319 and/or server application 217 retrieves the one or more portions of the media file 218 and accumulated temporal drift information associated with the one or more portions of the media file 218. As described above, accumulated temporal drift information may be associated with portions of the presentation timeline 510 and/or media file 218 having duration of time (e.g., 2 second fragments of a media file 218).

Next, at step 930, the media processing application 319 transmits the portion(s) of the media file 218 and the corresponding accumulated temporal drift information to a content server 110 and/or an endpoint device 115 via the network 105. Additionally or alternatively, at step 930, the server application 217 transmits the portion(s) of the media file 218 and the corresponding accumulated temporal drift information to an endpoint device 115 via the network 105.

At step 940, the media processing application 319 determines whether an additional media file 218 (or additional portions of a media file 218) are to be transmitted. If the media processing application 319 determines that an additional media file 218 or an additional portion of a media file 218 are to be transmitted, then the method 900 returns to step 910. If the media processing application 319 determines that no additional media files 218 or portions of a media file 218 are to be transmitted, then the method 900 terminates.

Figure 10:
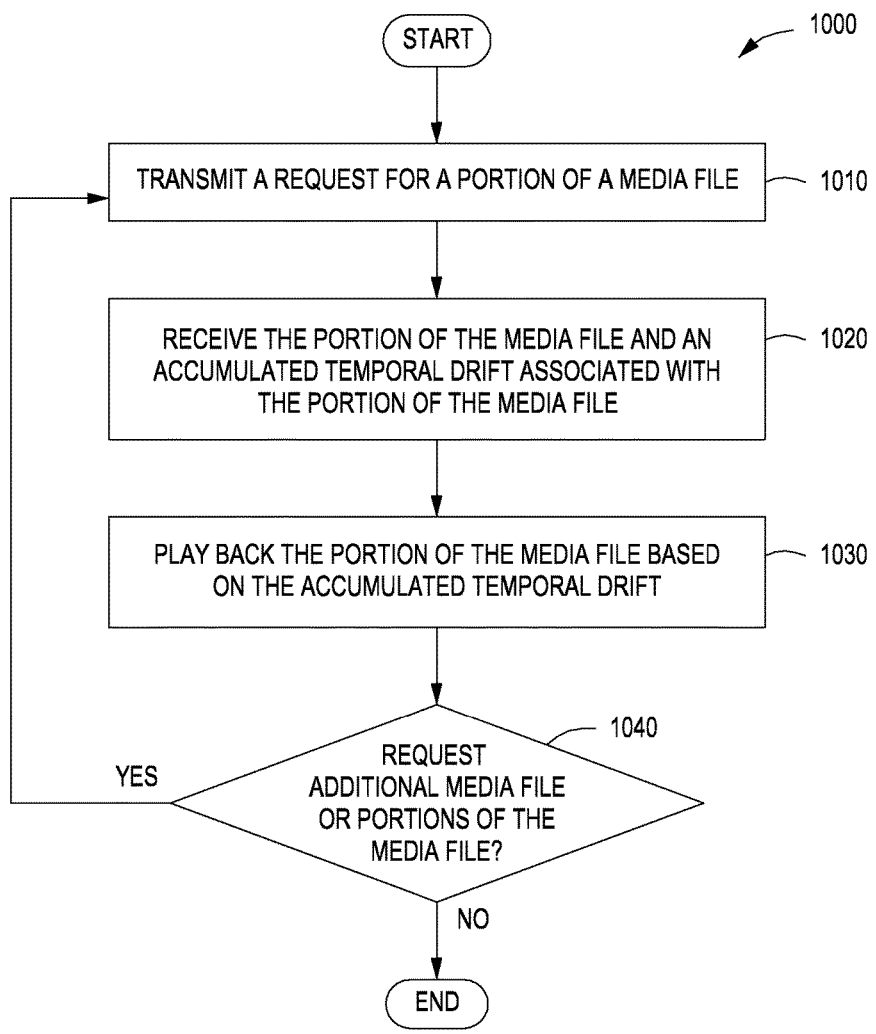
FIG. 10 illustrates a flow diagram of method steps for receiving accumulated temporal drift information associated with a media file from a content server, according to various embodiments of the present invention.

FIG. 10 illustrates a flow diagram of method steps for receiving accumulated temporal drift information associated with a media file 218 from a content server 110, according to various embodiments of the present invention. Although the method steps are described in conjunction with the systems of FIGS. 1-7, persons skilled in the art will understand that any system configured to perform the method steps, in any order, falls within the scope of the present invention.

As shown in FIG. 10, a method 1000 begins at step 1010, where the playback application 436 transmits a request for one or more portions of a media file 218 to the content server 110 and/or to the control server 120 via the network 105. At step 1020, in response to the request, the playback application 436 receives the one or more portions of the media file 218 and accumulated temporal drift information associated with the one or more portions of the media file 218 via the network 105.

Next, at step 1030, the playback application 436 plays back the portion(s) of the media file 218 based on the corresponding accumulated temporal drift information. For example, in some embodiments, the playback application 436 could read the accumulated temporal drift from metadata included in a portion of the media file 218. The playback application 436 could then adjust a delay parameter (e.g., an audio delay parameter and/or a video delay parameter) based on the accumulated temporal drift when playing back to the portion of the media file 218.

At step 1040, the playback application 436 determines whether an additional media file 218 (or additional portions of a media file 218) is to be requested. If the playback application 436 determines that an additional media file 218 or portion of a media file 218 is to be requested, then the method 1000 returns to step 1010. If the playback application 436 determines that no additional media files 218 or portions of a media file 218 are to be requested, then the method 1000 terminates.

In sum, a media processing application receives a presentation timeline specifying edits associated with an audio track and/or a video track. Then, for each non-sample boundary edit included in the presentation timeline, the media processing application determines whether to include the corresponding audio frame and/or video frame. This determination may be based on a temporal drift associated with including the audio frame and/or video frame, an accumulated temporal drift associated with the presentation timeline, and/or one or more temporal drift thresholds. The media processing application may further associate an accumulated temporal drift with each portion of a media file and transmit the portions of the media file 218 to a content server 110 and/or endpoint device 115.

At least one advantage of the disclosed techniques is that edits associated with a presentation timeline may be processed to reduce or eliminate temporal drift between an audio track and a video track included in the presentation timeline. Additionally, the effect of non-sample boundary edits on the end-user experience may be mitigated by transmitting metadata specifying an accumulated temporal drift to an endpoint device when the corresponding portions of the media file are transmitted to the endpoint device. Accordingly, the endpoint device is able to compensate for the accumulated temporal drift, such as by modifying an audio delay parameter associated with the endpoint device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

pow Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
    determining that an edit associated with a presentation timeline falls within boundaries of a video frame included in a video track corresponding to the presentation timeline;
    calculating a temporal drift associated with the edit, wherein the temporal drift comprises a duration of time between the edit and a boundary of the video frame;
    determining whether to include the video frame in the presentation timeline based on the temporal drift and an accumulated temporal drift associated with a location within the presentation timeline corresponding to the edit;
    computing an updated accumulated temporal drift based on whether the video frame is to be included in the presentation timeline; and
    generating metadata based on the updated accumulated temporal drift; and
    transmitting the metadata to a client device for enabling the client device to adjust for the updated accumulated temporal drift during playback associated with the presentation timeline.

2. The method of claim 1, wherein determining whether to include the video frame in the presentation timeline comprises determining whether a sum of the temporal drift and the accumulated temporal drift exceeds a threshold value.

3. The method of claim 2, further comprising including the video frame in the presentation timeline in response to determining that the sum does not exceed the threshold value.

4. The method of claim 2, wherein the threshold value is approximately 10 milliseconds to approximately 100 milliseconds.

5. The method of claim 1, wherein determining whether to include the video frame in the presentation timeline comprises determining whether the accumulated temporal drift is a positive value or a negative value.

6. The method of claim 5, wherein the video frame is included in the presentation timeline when the accumulated temporal drift is a negative value, and the video frame is excluded from the presentation timeline when the accumulated temporal drift is a positive value.

7. The method of claim 1, further comprising:
    generating a media file based on the presentation timeline; and
    associating the metadata with a portion of the media file that corresponds to the edit.

8. A non-transitory computer-readable storage medium including instructions that, when executed by a processor, cause the processor to perform the steps of:
    determining that an edit associated with a presentation timeline falls within boundaries of a video frame included in a video track corresponding to the presentation timeline;
    calculating a temporal drift associated with the edit, wherein the temporal drift comprises a duration of time between the edit and a boundary of the video frame;
    determining whether to include the video frame in the presentation timeline based on the temporal drift and an accumulated temporal drift associated with a location within the presentation timeline corresponding to the edit;
    computing an updated accumulated temporal drift based on whether the video frame is to be included in the presentation timeline; and
    generating metadata based on the updated accumulated temporal drift; and
    transmitting the metadata to a client device for enabling the client device to adjust for the updated accumulated temporal drift during playback associated with the presentation timeline.

9. The non-transitory computer-readable storage medium of claim 8, wherein determining whether to include the video frame in the presentation timeline comprises determining whether a sum of the temporal drift and the accumulated temporal drift exceeds the threshold value.

10. The non-transitory computer-readable storage medium of claim 9, further comprising including the video frame in the presentation timeline in response to determining that the sum does not exceed the threshold value.

11. The non-transitory computer-readable storage medium of claim 9, wherein the threshold value is approximately 10 milliseconds to approximately 100 milliseconds.

12. The non-transitory computer-readable storage medium of claim 8, wherein determining whether to include the video frame in the presentation timeline comprises determining whether the accumulated temporal drift is a positive value or a negative value.

13. The non-transitory computer-readable storage medium of claim 12, wherein the video frame is included in the presentation timeline when the accumulated temporal drift is a negative value, and the video frame is excluded from the presentation timeline when the accumulated temporal drift is a positive value.

14. The non-transitory computer-readable storage medium of claim 8, further comprising:
    generating a media file based on the presentation timeline; and
    associating the metadata with a portion of the media file that corresponds to the edit.

15. A control server, comprising:
    a memory storing a media processing application; and
    a processor coupled to the memory, wherein, when executed by the processor, the media processing application configures the processor to:
        determine that an edit associated with a presentation timeline falls within boundaries of a video frame included in a video track corresponding to the presentation timeline;
        calculate a temporal drift associated with the edit, wherein the temporal drift comprises a duration of time between the edit and a boundary of the video frame;
        determine whether to include the video frame in the presentation timeline based on the temporal drift and an accumulated temporal drift associated with a location within the presentation timeline corresponding to the edit;
        compute an updated accumulated temporal drift based on whether the video frame is to be included in the presentation timeline; and
        generate metadata based on the updated accumulated temporal drift; and
        transmit the metadata to a client device for enabling the client device to adjust for the updated accumulated temporal drift during playback associated with the presentation timeline.

16. The control server of claim 15, wherein the media processing application configures the processor to determine whether to include the video frame in the presentation timeline by determining whether a sum of the temporal drift and the accumulated temporal drift exceeds a threshold value.

17. A non-transitory computer-readable storage medium including instructions that, when executed by a processor, cause the processor to perform the steps of, comprising:
    transmitting a request for a portion of the media file associated with an audio track and a video track having a plurality of frames;
    in response, receiving the portion of the media file and metadata that indicates an accumulated temporal drift associated with the portion of a media file, wherein the received portion of the media file includes a second video track having a subset of the plurality of frames, wherein the accumulated temporal drift corresponds to a temporal drift between the second video track and the audio track, and wherein the temporal drift is associated with a difference in the plurality of frames and the subset of the plurality of frames and an edit made to a presentation timeline associated with the video track; and
    playing back the portion of the media file based on the accumulated temporal drift.

18. The computer-readable storage medium of claim 17, wherein playing back the portion of the media file based on the accumulated temporal drift comprises adjusting a delay parameter associated with an endpoint device.

19. The computer-readable storage medium of claim 17, wherein the request is transmitted via a network and the portion of the media file and the metadata are received via the network.

* * * * *